US007879308B1

(12) United States Patent
Chow et al.

(10) Patent No.: US 7,879,308 B1
(45) Date of Patent: *Feb. 1, 2011

(54) MULTIWALL CARBON NANOTUBE FIELD EMITTER FABRICATED BY FOCUSED ION BEAM TECHNIQUE

(75) Inventors: Leo Chow, Orlando, FL (US); Guangyu Chai, Orlando, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 1640 days.

This patent is subject to a terminal disclaimer.

(21) Appl. No.: 11/098,247

(22) Filed: Apr. 4, 2005

Related U.S. Application Data

(60) Continuation-in-part of application No. 10/961,929, filed on Oct. 8, 2004, and a continuation-in-part of application No. 10/424,336, filed on Apr. 25, 2003, now Pat. No. 7,011,884, which is a division of application No. 09/528,259, filed on Mar. 17, 2000, now Pat. No. 6,582,673.

(60) Provisional application No. 60/511,787, filed on Oct. 16, 2003, provisional application No. 60/559,745, filed on Apr. 6, 2004.

(51) Int. Cl.
*D01F 9/12* (2006.01)

(52) U.S. Cl. ............... 423/447.8; 423/445 R; 423/447.1; 423/447.3; 423/447.7; 423/448; 313/495; 445/24; 438/20; 977/742; 977/745; 977/752; 977/842; 977/843; 977/847; 977/890; 977/891; 977/939

(58) Field of Classification Search ............ 313/310, 313/495; 977/742, 939, 745, 752, 842, 843, 977/847, 890, 891; 438/20; 250/423 R; 423/445 R, 445, 447.1–447.8, 448 R; 445/24
See application file for complete search history.

(56) References Cited

U.S. PATENT DOCUMENTS

| 4,025,689 A | 5/1977 | Kobayashi | 428/402 |
|---|---|---|---|
| 4,228,142 A | 10/1980 | Holcombe, Jr. | 423/449 |
| 4,770,867 A * | 9/1988 | Coulon et al. | 423/447.3 |
| 4,855,091 A | 8/1989 | Geus | 264/22 |
| 5,165,909 A | 11/1992 | Tennent | 423/447 |

(Continued)

OTHER PUBLICATIONS

Janssen et al., The sharpening of field emitter tips by ion sputtering, J. Phys. D: Appl. Phys., 1971, vol. 4.*

*Primary Examiner*—Nimeshkumar D Patel
*Assistant Examiner*—Thomas A Hollweg
(74) *Attorney, Agent, or Firm*—Brian S. Steinberger; Phyllis K. Wood; Law Offices of Brian S. Steinberger, P.A.

(57) ABSTRACT

A multi-wall carbon nanotube field emitter and method of producing the same is disclosed. The multi-wall carbon nanotube field emitter comprises a nanotube having a diameter between approximately 1 nanometer and approximately 100 nanometers with an integrally attached outer layer of graphitic material that is approximately 1 micrometer to approximately 10 micrometers in diameter attached to an etched tip of a wire. The tip of the wire is etched to form a tip and a slot is fabricated in the tip for alignment and attachment of the carbon nanotube. A focus ion beam is used to weld the nanotube to the tungsten tip for electron field emission applications.

14 Claims, 6 Drawing Sheets

U.S. PATENT DOCUMENTS

| | | | |
|---|---|---|---|
| 5,346,683 A | 9/1994 | Green | 423/447 |
| 5,456,986 A | 10/1995 | Majetich | 428/403 |
| 5,543,378 A | 8/1996 | Wang | 502/174 |
| 5,560,898 A | 10/1996 | Uchida | 423/461 |
| 5,641,466 A | 6/1997 | Ebbesen | 423/447.2 |
| 5,698,175 A | 12/1997 | Hiura | 423/447.1 |
| 5,747,161 A | 5/1998 | Iijima | 428/367 |
| 5,780,101 A | 7/1998 | Nolan | 427/216 |
| 5,965,267 A | 10/1999 | Nolan | 428/408 |
| 6,159,538 A | 12/2000 | Rodriguez et al. | 427/213.31 |
| 6,331,209 B1 | 12/2001 | Jang et al. | 427/249.1 |
| 6,333,016 B1 * | 12/2001 | Resasco et al. | 423/447.3 |
| 6,350,488 B1 | 2/2002 | Lee et al. | 427/249.1 |
| 6,413,487 B1 | 7/2002 | Resasco et al. | 423/447.3 |
| 6,455,021 B1 | 9/2002 | Saito | 423/447.3 |
| 6,479,028 B1 | 11/2002 | Kaner et al. | 423/414 |
| 6,582,673 B1 * | 6/2003 | Chow et al. | 423/445 R |
| 2004/0026629 A1 * | 2/2004 | Fujieda et al. | 250/423 R |

* cited by examiner

MULTIWALL CARBON NANOTUBE FIELD EMITTER FABRICATED BY FOCUSED ION BEAM TECHNIQUE

This application is a continuation-in-part of U.S. patent application Ser. No. 10/961,929 filed on Oct. 8, 2004 which claims the benefit of priority to U.S. Provisional Application Ser. No. 60/511,787 filed on Oct. 16, 2003 and is a continuation-in-part of U.S. patent application Ser. No. 10/424,336 filed on Apr. 25, 2003, now U.S. Pat. No. 7,011,884, as a divisional application of U.S. patent application Ser. No. 09/528,259 filed on Mar. 17, 2000, now U.S. Pat. No. 6,582,673; and also claims the benefit of priority to U.S. Provisional Application Ser. No. 60/559,745 filed Apr. 6, 2004.

FIELD OF THE INVENTION

This invention relates to a novel method of manufacturing a multi-wall carbon nanotube electron field emitter and, in particular, to methods, systems, apparatus and devices for production of a novel monolithic structure comprising a multi-wall carbon nanotube electron field emitter with an outer graphitic layer provided by a first chemical vapor deposition and secondly by a focused ion beam technique to attach the monolithic multi-wall carbon nanotube onto an etched metal wire wherein the carbon nanotube is modified for emission from the tip.

BACKGROUND AND PRIOR ART

After the discovery of carbon nanotubes in 1991, scientific efforts have been devoted to the production of carbon nanotubes in higher yields; the production of carbon nanotubes with consistent dimensions, e.g., diameter and length; processes which separate nanotubes from other reaction products; processes which eliminate the entanglement of tubes with each other and the development of useful applications.

Currently, carbon nano particles including both nanotubes and monofilaments are found in extended commercial applications in modern technologies, for example, for manufacture of composite materials, nanoscale machines, flat panel displays, and computer memory devices. The wide application of carbon nanotubes is based on their unique physical and mechanical properties, which show the high electrical and thermal conductivity, and high strength along the nanotubes' axis.

Their high aspect ratio, mechanical resilience and excellent electrical conduction make them ideal for probe microscopy tips. There are several different types of scanning probe microscopy, including scanning tunneling microscopy (STM), scanning force microscopy (SFM), atomic force microscopy (AFM), magnetic force microscopy (MFM), and magnetic resonance force microscopy (MRFM). Nanotubes have previously been made into atomic force microscopy (AFM) tips and have proven to have great advantages in imaging and manipulation over conventional silicon and silicon nitride tips. AFM instruments are well known for producing images with resolution in the nanometer or smaller range. AFM resolution is dependent on physical characteristics of the scanning probe including composition, size, shape and rigidity of the probe. Both length and width (or diameter) of the probe affect the resolution because, for example, the length limits the maximum depth of a detail that may be measured, and the width limits the minimum breadth of a detail that may be measured. Silicon probes are commonly used, but have a tip diameter generally greater than 10 nm, and are easily damaged or worn during use. Scanning probes made of carbon nanotubes have been shown to be acceptable alternatives to silicon probes and are known to be mechanically stable.

U.S. Pat. No. 6,582,673 issued Jun. 24, 2003 contributed a more consistent, predictable method for manufacturing a particular configuration of carbon nanotubes as well as providing a solution to the problems associated with handling and manipulating the "small" wand which is only visible with high-power electron microscopes, or other costly visual aids. Through the process disclosed therein, a "graphitic outer layer" defined as a carbon material comprising one or more distinct structures, is intentionally formed during the carbon nanotubes production and becomes an integral part of the carbon nanotubes device.

However, there are no easy and controllable methods to attach a carbon nanotube to a scanning probe tip, due to the extremely small size of the carbon nanotubes. Previous approaches have included the mechanical attachment of a CNT onto an AFM tip, chemical vapor deposition growth of a CNT directly onto commercial atomic force microscope made of Si or one of its derivatives, and electric or magnetic field induced multi-wall nanotube probe attachment.

U.S. patent application Ser. No. 10/961,929 filed on Oct. 8, 2004 discloses a more consistent and controlled method for attaching a novel carbon nanotube probe to the SPM cantilever tip using Focus Ion Beam (FIB) technology. Through the method of the present invention, a FIB tool is used to form a slot in the SPM cantilever tip and the carbon nanotube probe is inserted into the formed slot. The inserted carbon nanotube probe is welded to the SPM cantilever tip using the FIB tool to deposit metal atoms to the joint between the carbon nanotube probe and the cantilever tip, thus welding the carbon nanotube probe to the cantilever tip.

Since the pioneer work on the field emission from carbon nanotubes there have been intense studies of the field emission properties of the carbon nanotubes. Among the work on field emission from individual nanotubes, most of the work was carried out inside a transmission (or scanning) electron microscope on a substrate that contains plural carbon nanotubes. A microprobe is then used to select one particular carbon nanotube for the field emission study. While this method is useful for field emission studies, it is not practicable for real applications. The few field emission measurements carried out using a fabricated individual nanotubes emitter typically employed an optical or electron microscope to attach a carbon nanotubes or a carbon nanotubes bundle to an nickel (Ni) or tungsten (W) tip with conducting glue or use of van de Waals force. Through these studies, it has been established that the carbon nanotubes is an ideal electron field emitter with the following advantages over the prior art: (1) high brightness, (2) low energy spread, (3) emission current stability, and (4) long lifetime.

The following approaches have been used for the fabrication of individual carbon nanotubes field emitters. Mechanical attachment using van der Waals forces was developed in 1995. A DC arc method was used to produce a nanotubes containing boule which was then baked in air to etch away all but the best nanotube material. Then individual nanotubes were attached to an 8 μm diameter graphitic fiber electrode through van der Waals force. The graphitic fiber was then attached to a stainless steel electrode with silver paint. A SEM micrograph reveals that the nanotube is not an individual nanotube, but a stalk of 5 to 10 multi-wall nanotubes adhered together. Using this technique, it was extremely difficult to fabricate a nanotube electron emitter due to its nanometer size.

Direct growth of multiple wall carbon nanotubes on a Ni catalyst was developed in 2002. Following this technique, high resolution electron beam lithography was used to pattern the Ni catalyst on a substrate. The spacing between the catalyst was between 10 and 100 μm. Using PECVD with a $C_2H_2$ and a $NH_3$ gas mixture, 5 μm long multi-wall nanotubes having a width of 60 nm were grown on a substrate. A scanning anode field emission microscope with a probe ball diameter of 100 μm was used to measure the emission current from individual carbon nanotube tips. Although it was claimed that the emission current was from an individual nanotube, the geometry is similar to that of a carbon nanotube film having an array of nanotubes.

Using a mechanical attachment technique, conductive carbon tape is applied to the tip of an electrochemically etched tungsten wire with a 200 nm radius tip and, under an optical microscope, individual nanotubes are mounted on the tungsten tip with the carbon tape.

Another prior art technique used a scanning electron microscope to pick up and attach carbon nanotubes to a support by irradiation. During pick up, the e-beam dissociates residual organic species. The deposits are strong but it is hard to evaluate the electrical properties of the contacts.

The present invention contributes a more consistent and controlled method for using Focus Ion Beam (FIB) technology to fabricate an electron field emitter. The FIB technique is a standard, well-developed semiconductor industry technique. It is very controllable, and using the technique, our carbon nanotube with a graphitic outer layer (see U.S. Pat. No. 6,582,673 B1) can be attached to a tip of a tungsten wire approximately along the axis of the tungsten wire. Through the method of the present invention, a 0.20 mm diameter tungsten wire is etched to a sharp tip and a FIB tool is used to fabricate a slot on the sharp tip of the tungsten wire. A carbon fiber with a nanotube tip is wielded to the tungsten tip.

SUMMARY OF THE INVENTION

A primary objective of the invention is to provide a new method, system, apparatus and device is to provide a novel carbon nanotubes field emitter.

A second objective of the invention is to provide a new method, system, apparatus and device to ensure that the carbon nanotube is open-ended to reduce the threshold field to improve the ability to extract electrons from the carbon nanotube.

A third objective of the present invention is to provide a new method, system, apparatus and device is to provide a novel carbon nanotubes cold cathode field emitter.

A fourth objective of the present invention is to provide a new method, system, apparatus and device is to provide a novel carbon nanotubes cold cathode field emitter having the ability to carry increased current to provide increased brightness.

A fifth objective of the invention is to provide a new method, system, apparatus and device is to provide a novel carbon nanotubes field emitter that emits coherent electrons making it possible to produce electron holography.

A sixth objective of the present invention is to provide a new method, system, apparatus and device is to provide a novel carbon nanotubes field emitter that can operate at relative low vacuum of within a range of approximately $10^{-7}$ or $10^{-8}$ torr without being contaminated This will contribute to the reduction of cost of a conventional FE-TEM, where ultra-high vacuum of $10^{-9}$ to $10^{-10}$ torr is needed to avoid the contamination of the field emission source. The preferred embodiment of the present apparatus, method, system and device of the present invention results in carbon nanotubes having a diameter between approximately 1 nanometer and approximately 100 nanometers with an integrally attached outer layer of graphitic material that is approximately 1 micrometer to approximately 10 micrometers in diameter. The novel nanotube with graphitic outer layer is welded to a tip of a tungsten wire with a focus ion beam tool.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | |
|---|---|
| 10 | carbon nanotube tip with a graphitic outer layer |
| 11 | tungsten wire tip |
| 13 | slot in tungsten wire tip |
| 20 | carbon nanotube probe |
| 30 | painted metal wire |
| 32 | intermediate carbon fiber |
| 34 | plural micron size carbon fibers |
| 36 | micromanipulator needle tip |
| 38 | slot in micromanipulator needle tip |

Figure 1:
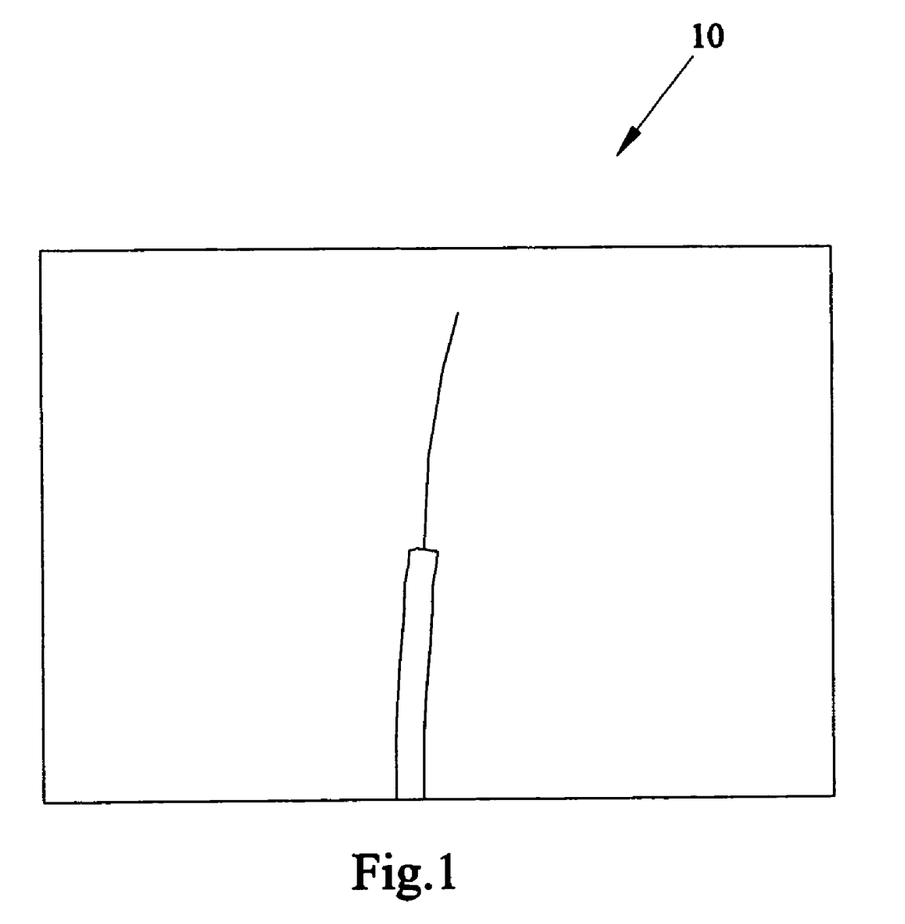
FIG. 1 shows the carbon nanotube tip with a graphitic outer layer that form the electron field emitter of the present invention.

The method and system of the present invention produces a carbon nanotube for use as a field emitter 10 with field emission from the tip of the nanotube as shown in FIG. 1. The carbon nanotube tip 10 comprises a carbon nanotube with a graphitic outer layer. The system for attaching the carbon nanotube probe to the tungsten wire includes a novel carbon nanotubes tip comprising a graphitic outer layer with a nanotube tip and a means for retrieving and picking up the carbon nanotube probe. Standard etching technique is used to etch a 1-5 mil tungsten wire to a sharp tip, an FIB tool is used to fabricate a slot in the tungsten tip, insert the carbon nanotubes probe with a nanotube tip into the slot in the tungsten wire tip, and weld the carbon nanotubes probe with a nanotube tip in the slot on the tungsten wire tip for use in electron field emission applications.

Figure 2:
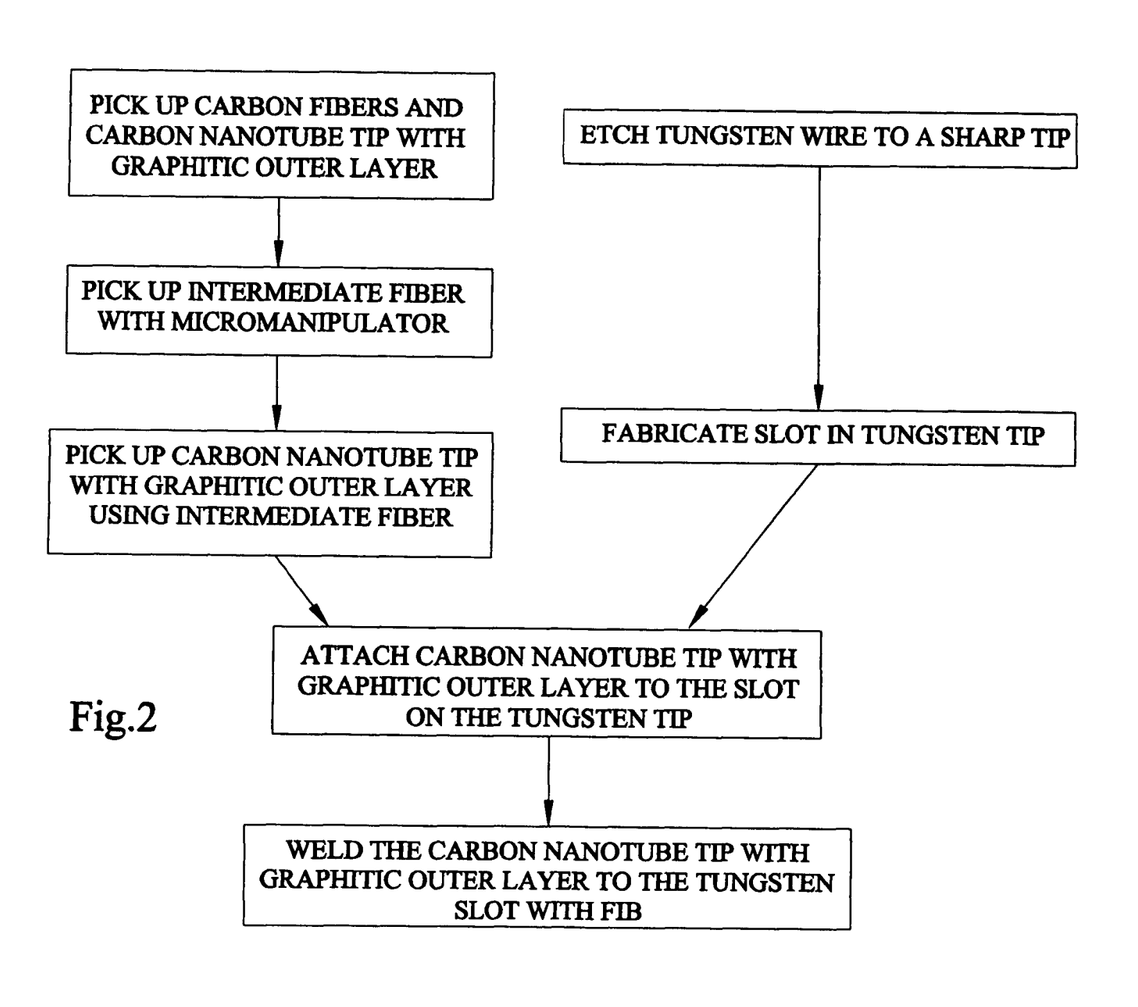
FIG. 2 is a flow chart of a method of producing a nanotube field emitter from a carbon nanotube tip with a graphitic outer layer.

A method for attaching the carbon nanotubes probe 20 to the tungsten wire tip 11 is shown in the flow diagram of FIG. 2. For purpose of illustration and description, and not limitation, the method is described for attaching a nanotube with a graphitic outer layer as described in U.S. Pat. No. 6,582,673, to a tungsten wire tip. The carbon nanotube tip with a graphitic outer layer comprises an individual carbon nanotube as an inner core of a much larger carbon fiber, or graphitic outer layer. According to the present invention, the carbon nanotube with graphic outer layer fabrication process includes growing said carbon nanotube core by changing said gaseous mixture to a stream consisting, of approximately 10% carbon-containing gas and approximately 90% inert gas, while increasing said temperature of said reaction vessel from between 500° C. and 750° C. to a range between approximately 900° C. and approximately 1000° C. The individual multi-wall nanotube sticks out as a tip of the carbon nanotube probe resembling a co-axial cable. The nanotube and the graphitic outer layer are collectively hereinafter referred to as a carbon nanotube tip.

Figure 3:
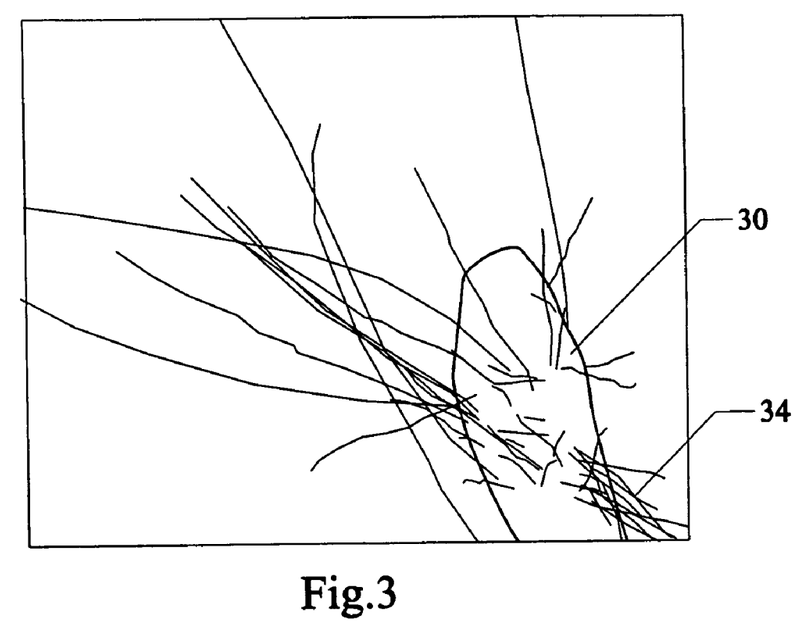
FIG. 3 is a diagram of a metal tip with silver paint coating that is used to pick up plural carbon fibers and the carbon nanotube probe.

The novel carbon nanotube tip is prepared by catalytic chemical vapor deposition following the method described in U.S. Pat. No. 6,582,673, which is assigned to the same assignee as the present application and is incorporated herein by reference hereto. Plural micron size carbon fibers 34 are provided along with the carbon nanotube probe 20 for use in attaching the carbon nanotube probe 20 to the tungsten wire tip 11, as shown in the flow diagram of FIG. 2. Then a metal tip, or wire 30, with a silver paint coating is used to pick up micron size carbon fibers 34 and the carbon nanotube probe 20 as shown in FIG. 3. A micromanipulator is used to pick up the intermediate carbon fiber 32 and the intermediate carbon fiber 32 is then used to pick up the carbon nanotube probe 20.

Figure 4:
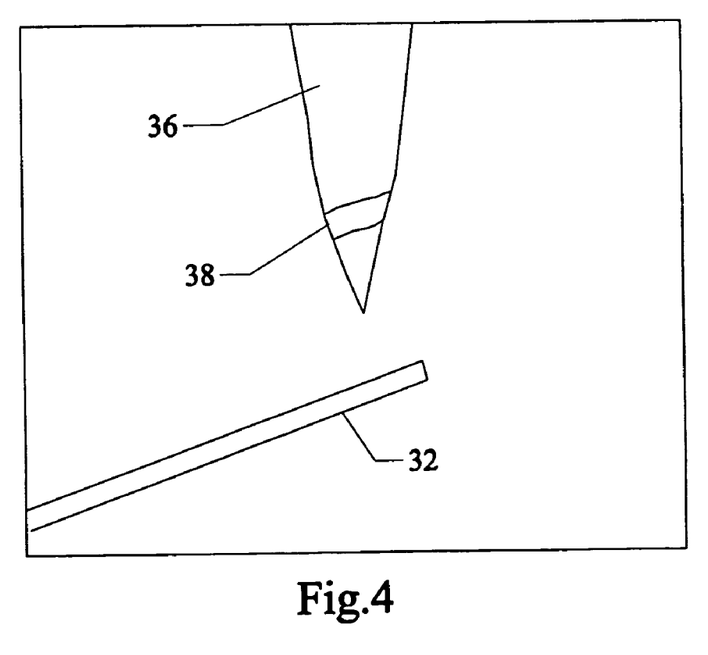
FIG. 4 is a diagram of a micromanipulator needle picking up an intermediate carbon fiber.
Figure 5A:
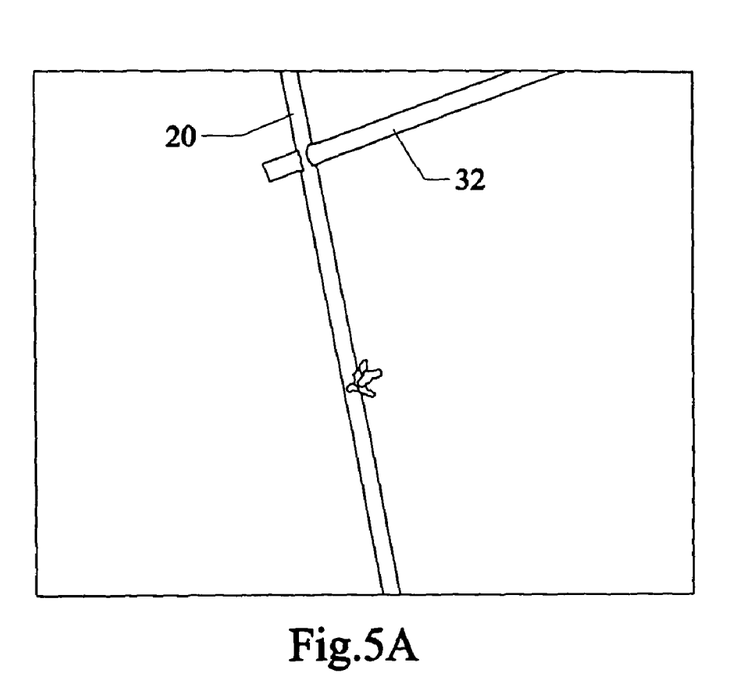
FIG. 5a is an image showing use of the intermediate carbon fiber to pick up a carbon nanotube probe.

The micromanipulator can only move with three free degrees, x, y, and z. In order to adjust the carbon nanotube probe alignment angle freely, the intermediate carbon fiber 32 is used to pick up the carbon nanotube probe 20. As shown in FIG. 4, the micromanipulator used in the picking up process is equipped with a metal needle 36 in the focus ion beam (FIB) chamber. Using FIB milling, a slot 38 is formed on the needle tip 36 perpendicular to the needle axis for receiving the intermediate carbon fiber 32. The FIB tool can cut away (mill) material from a defined area with dimensions typically in square microns or deposit material onto it. The FIB tool uses a controlled beam of ions to remove material from a specimen with surgical precision. Following the flow diagram in FIG. 2, the micromanipulator picks up one of the plural carbon fibers 34 stuck on the painted metal wire 30 for use as an intermediate carbon fiber 32. Later, the intermediate fiber 32 is used as the new tip of the micromanipulator for picking up the carbon nanotube probe 20 as shown in FIG. 5a.

Referring back to FIG. 4, the intermediate carbon fiber 32 is inserted into the slot 38 formed on the needle tip 36 as shown in FIG. 4. Then using the FIB tool, the intermediate carbon fiber 32 is welded in the slot 38. This is not conventional welding wherein heat is used to melt down metal and bond two different objects with the metal. In the preferred embodiment of the present invention, the FIB tool is used to deposit metal atoms, one by one, to the joint between the carbon fiber and the wall of the slot to form a pile of Pt metal approximately one micron in size that bonds the carbon fiber to the tungsten tip. The geometry of the plural carbon fiber is a cylinder. When touching with a plane surface or another cylinder (another carbon fiber), the contact is only a single line or even a single point, which will make the welding junction weak. Ion milling of the slot before each welding step is done at the desired contact position to avoid point-to-point or line-to-line contact and to make the welded junction stronger.

Figure 5B:
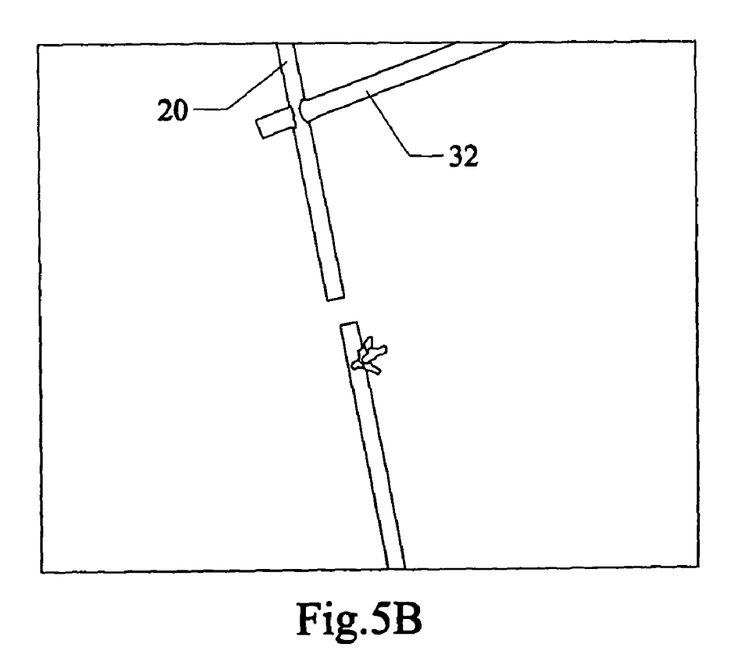
FIG. 5b is an image of a carbon nanotube probe welded to the intermediate carbon fiber.

The intermediate carbon fiber 32 is used as a new metal needle to pick up the carbon nanotube probe 20. FIG. 5a shows the intermediate carbon fiber 32 picking up the novel carbon nanotube probe 20 for attachment to the tungsten wire tip 11. Once welded in place, FIB milling is used to cut the carbon nanotube probe 20 from the root as shown in FIG. 5b.

FIB milling is also used to prepare the tungsten wire for receiving the carbon nanotube probe 20 and for attaching the carbon nanotube probe 20 to the tungsten wire tip 11. Since the carbon nanotube probe tip can be easily damaged by the ion beam, the intermediate carbon fiber 32 and carbon nanotube probe 20 are kept a safe distance from the ion beam during the milling step. Therefore, scanning electron microscopy (SEM) is applied to the carbon nanotube probe 20 to determine the dimension of the graphitic outer layer prior to fabrication of the slot in the tungsten wire tip.

Figure 6A:
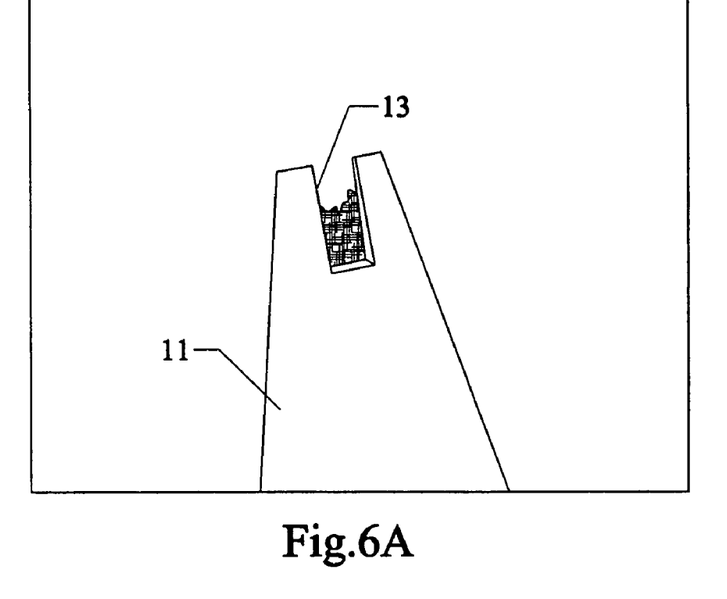
FIG. 6a is an image of the etched tungsten wire with a slot fabricated at the tip for insertion of the carbon nanotube probe.
Figure 6B:
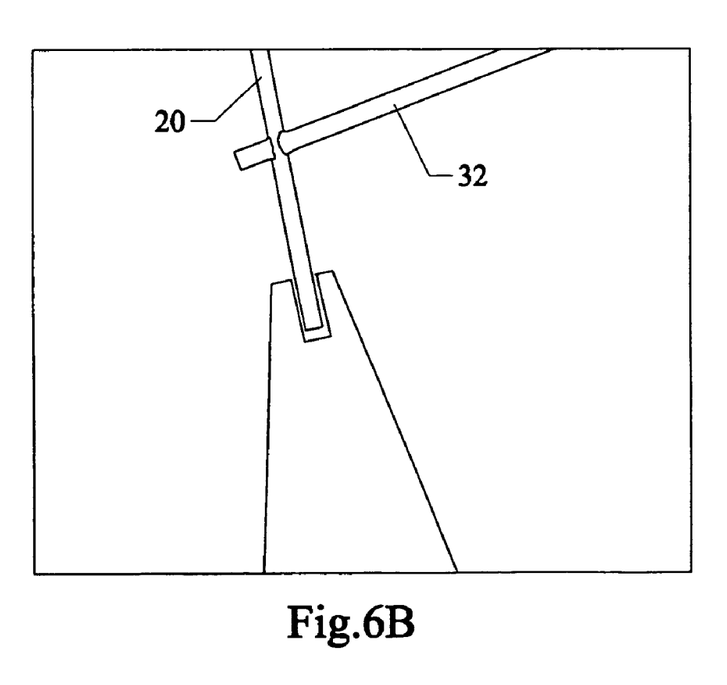
FIG. 6b is an image of the carbon fiber probe being inserted and aligned in the slot in the tip of the tungsten wire.

FIG. 6a shows a conventional wire, a tungsten wire for example, with a slot 13 in the tip 11 prior to attachment of the carbon nanotube probe 20. Referring back to the flow chart of FIG. 2, ion milling with the FIB tool is used to mill a slot 13 in the tip 11 of the tungsten wire as shown in FIG. 6a. The width of the slot formed in the tungsten wire tip 11 is sufficiently greater than the graphitic outer layer diameter to allow alignment of the carbon nanotube probe 20 in the slot 13 fabricated in the tungsten wire tip 11. The carbon nanotube probe 20 is inserted and aligned in the slot 13 formed in the tungsten wire tip 11 as shown in FIG. 6b. Using the FIB tool, the carbon nanotube probe 20 is welded into the slot 13 in the tungsten wire tip 11 with a platinum metal to form a pile of metal approximately one micron in size to bond the carbon nanotube probe 20 in the slot 13 in the tungsten wire tip 11. Other means for affixing the carbon nanotube probe to the tungsten wire tip 11 may be substituted and are understood to be within the scope of the present invention.

Figure 7:
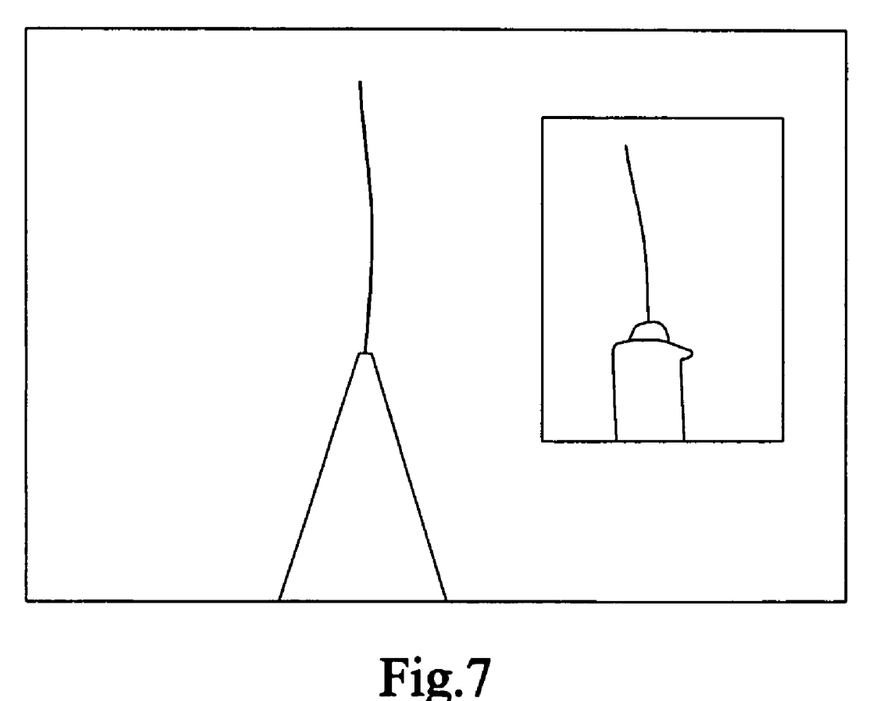
FIG. 7 shows the carbon nanotube field emitter and the insert shows the carbon nanotube tip of the field emitter.

After the carbon nanotube probe 20 is attached to the tungsten wire tip 11, FIB milling is used to detach the intermediate carbon fiber 32 from the carbon nanotube probe 20. The resulting nanotube is ready for field emission from the nanotubes tip as shown in FIG. 7.

In summary, a method for manufacturing individual multi-wall carbon nanotube electron field emitters using focused ion beam technique is disclosed. The multi-wall carbon nanotube probe with a graphitic shield is synthesized using a chemical vapor disposition technique and a focus ion beam technique is thereafter utilized to attach the monolithic multi-wall carbon nanotube with a graphitic outer layer onto an etched wire, such as tungsten wire. Field emission measurements are carried out in a vacuum of approximately $10^{-7}$ ton. It has been found that the monolithic structure of the carbon nanotube possess superior emission characteristics such as low threshold voltage (0.83 V/μm), high emission current (1 μA) per emitter, and a high damage threshold. This can be seen in the current vs. voltage plot in FIG. 7.

The field emission carbon nanotubes of the present invention may be used as an electron source for a scanning electron microscope (SEM), a transmission electron microscope (TEM) or any other device that uses electrons, such as a CRT or plasma flat panel display. Advantages of using the field emission carbon nanotubes of the present invention includes increased brightness due to the ability to carry increased amount of current, a lower threshold field making it easier to extract electrons from the carbon nanotube, has a long life as compared to use of an FE source, and has the ability to function as a coherent electron source for uses such as electron holography.

While the method and system of the present invention have been illustrated and described for attachment of a carbon nanotube tip to a tungsten wire tip, the method may also be used for attaching carbon fibers or nanotubes to other geometrical surfaces such as in a parallel configuration for use testing other surface properties. In another example, the carbon nanotube tip is attached using the novel method to a standard scanning probe microscope cantilever as described in co-pending patent application Ser. No. 10/961,929 filed on Oct. 8, 2004 and assigned to the same assignee as the present application. Other uses for the novel attachment method will be obvious to those skilled in the art. The method of the present invention combines milling and welding using FIB tools to prepare a surface for receiving a carbon fiber and carbon nanotube probe and for attaching the same to the prepared surface. Each milling and welding step is reliable and controllable and can be accomplished in minimum time, thus reducing fabrication cost. By arranging the angle between the intermediate file and the nanotube probe, plus the five degree of free movement of the FIB tool, the carbon fiber with nanotube tip can be precisely aligned with the conventional wire tip axis.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for manufacturing a carbon nanotube device consisting of a carbon nanotube core having an integrally attached graphitic outer layer comprising the steps of:
    a) preparing a transition metal catalyst on a selected substrate;
    b) placing said transition metal catalyst and substrate of step (a) in a reaction vessel;
    c) purging said reaction vessel of step (b) by heating said reaction vessel to a temperature between 500° C. and 750° C. while introducing a gaseous mixture of hydrogen and an inert gas;
    d) growing said carbon nanotube core by changing said gaseous mixture of step (c) to a stream consisting of approximately 10% carbon-containing gas and approximately 90% inert gas, while increasing said temperature of said reaction vessel to a range between approximately 900° C. and approximately 1000° C.;
    e) growing said integrally attached graphitic outer layer on said carbon nanotube core of step (d) by changing said reaction parameters to promote said distinct formation of graphitic carbon material;
    f) cutting away a portion of said graphitic outer layer to leave said carbon nanotube core partially exposed to produce the carbon nanotube device resembling a co-axial cable with the carbon nanotube extending a distance from an integrally attached outer graphic layer;
    g) etching a 1-5 mil tungsten wire to a sharp tip;
    (h) fabricating a slot at said sharp tip of said tungsten wire; and
    (i) welding the graphic outer layer of said carbon nanotube device with said carbon nanotube core to said tungsten tip using focus ion beam technology to deposit metal to the interface between the graphic outer layer and the slot to bond the carbon nanotube device to the tip.

2. The method of claim 1 wherein said reaction parameters of step (e) are changed to include the step of:
    annealing said a reaction product of step (d) by introducing to said reaction vessel a gaseous mixture consisting of approximately 10% carbon-containing gas and approximately 90% inert gas while maintaining said temperature of said reaction vessel at approximately 1000° C. to promote growth of a graphitic carbon coating.

3. The method of claim 1 wherein said transition metal catalyst is selected from a group consisting of cobalt, nickel, iron, mixtures and alloys thereof.

4. The method of claim 1 wherein said transition metal catalyst is a mixture of 50% iron and 50% nickel.

5. The method of claim 1 wherein said selected substrate for said transition metal catalyst is silicon.

6. The method of claim 1 wherein said inert gas is selected from a group consisting of argon, helium and nitrogen.

7. The method of claim 1 wherein said carbon-containing gas is selected from a group consisting of methane, ethane, propane, butane, ethylene, cyclohexane, carbon monoxide and carbon dioxide.

8. The method of claim 1 wherein said carbon-containing gas is methane.

9. The method of claim 1 wherein said graphitic outer layer forms on said carbon nanotube core at temperatures of approximately 1000° C.

10. A method of producing a carbon nanotube field emitter, comprising the steps of:
    providing a carbon nanotube probe having a first end and a second end, said first end having a graphic outer layer and an individual carbon nanotube core extending through said graphic outer layer and a distance therefrom resembling a co-axial cable wherein said second end is said individual carbon nanotube core;
    retrieving and picking up said carbon nanotube probe;
    attaching said graphic outer layer of said carbon nanotube probe to a sharp tip of a wire using a focused ion beam tool with said carbon nanotube core forming said carbon nanotube field emitter.

11. The method of claim 10, wherein said providing step includes the step of:
    a) preparing a transition metal catalyst on a selected substrate;
    b) placing said transition metal catalyst and substrate of step (a) in a reaction vessel;
    c) purging said reaction vessel of step (b) by heating said vessel to a temperature between 500° C. and 750° C. while introducing a gaseous mixture of hydrogen and an inert gas;
    d) growing said carbon nanotube core by changing said gaseous mixture of step
    (c) to a stream consisting of approximately 10% carbon-containing gas and approximately 90% inert gas, while increasing said temperature of said reaction vessel to a range between approximately 900° C. and approximately 1000° C.;
    (e) growing an integrally attached graphitic outer layer on said carbon nanotube core of step (d) by changing said reaction parameters to promote said distinct formation of graphitic carbon material; and (f) cutting away a portion of said graphitic outer layer to leave said carbon nanotube core partially exposed.

12. The method of claim 10, wherein said retrieving and picking up step includes the steps of:
providing a wire with plural carbon fibers attached thereto;
attaching one of said plural carbon fibers to a focus ion beam (FIB) micromanipulator needle to use as an intermediate carbon fiber; and
using said intermediate carbon fiber for picking up said carbon nanotube probe.

13. The method of claim 10 wherein said step of attaching said carbon nanotube probe to said tip of said wire comprises the steps of:

etching an end of said wire to produce a sharp tip;
fabricating a slot in said sharp tip;
inserting said carbon fiber probe into said slot in said sharp tip; and
bonding said carbon fiber probe in said slot.

14. The method of claim 13, wherein said inserting step includes the step of:
aligning said carbon nanotube probe in said slot in said sharp tip, wherein said carbon nanotube probe with said carbon nanotube core extends outwardly approximately along an axis of said wire.

\* \* \* \* \*